United States Patent
Van Den Brand et al.

(10) Patent No.: US 7,625,539 B2
(45) Date of Patent: Dec. 1, 2009

(54) PROCESS FOR PRODUCING A PURIFIED GAS STREAM

(75) Inventors: Cornelis Petrus Johannes Maria Van Den Brand, Amsterdam (NL); Lydia Singoredjo, Amsterdam (NL); Johannes Theodorus Maria Smits, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 12/092,367

(22) PCT Filed: Nov. 2, 2006

(86) PCT No.: PCT/EP2006/068023

§ 371 (c)(1),
(2), (4) Date: May 1, 2008

(87) PCT Pub. No.: WO2007/065765

PCT Pub. Date: Jun. 14, 2007

(65) Prior Publication Data

US 2008/0279759 A1    Nov. 13, 2008

(30) Foreign Application Priority Data

Nov. 4, 2005    (EP) .................................. 05110327

(51) Int. Cl.
*C01B 17/04*    (2006.01)
*C01B 17/16*    (2006.01)

(52) U.S. Cl. ........................ 423/222; 423/563; 423/564; 423/574.1

(58) Field of Classification Search ................. 423/564, 423/210, 242.1, 511, 560, 561, 562, 563, 423/566.2, 567.1, 569, 573.1, 222, 574.1; 62/612, 619
See application file for complete search history.

(56) References Cited

U.S. PATENT DOCUMENTS

| 4,430,317 | A  | * | 2/1984  | Reed et al. ................ 423/574.1 |
| 6,199,403 | B1 | * | 3/2001  | Cole et al. .................... 62/613 |
| 6,962,680 | B1 | * | 11/2005 | Ishigaki et al. ......... 423/244.09 |

FOREIGN PATENT DOCUMENTS

| EP | 1338557    | 8/2003  |
| JP | 08290904   | 11/1996 |
| JP | 09255974   | 9/1997  |
| JP | 10028837   | 2/1998  |
| WO | WO9960316  | 11/1999 |
| WO | WO0029797  | 5/2000  |

* cited by examiner

*Primary Examiner*—Wayne Langel
*Assistant Examiner*—Syed Iqbal
(74) *Attorney, Agent, or Firm*—Charles W. Stewart

(57) ABSTRACT

A process for producing a purified gas stream from a feed gas stream comprising contaminants, the process comprising the steps of: (a) removing contaminants from the feed gas stream to obtain the purified gas stream and a sour gas stream comprising $H_2S$ and RSH; (b) separating the sour gas stream comprising $H_2S$ and RSH into a gas stream enriched in $H_2S$ and a residual gas stream comprising RSH; (c) converting $H_2S$ in the gas stream enriched in $H_2S$ to elemental sulphur in a Claus unit, thereby obtaining a first off-gas stream comprising $SO_2$; (d) converting $SO_2$ in the first off-gas stream comprising $SO_2$ to $H_2S$ in a Claus off-gas treating reactor to obtain a second off-gas stream comprising $H_2S$; (e) converting RSH from the residual gas stream comprising RSH to $H_2S$ in an RSH conversion reactor to obtain a residual gas stream comprising $H_2S$, wherein at least one of the operating conditions of the RSH conversion reactor is different from the corresponding operating condition of the Claus off-gas treating reactor.

15 Claims, No Drawings

PROCESS FOR PRODUCING A PURIFIED GAS STREAM

PRIORITY CLAIM

The present application claims priority of European Patent Application No. 05110327.3 filed 4 Nov. 2005.

The invention relates to a process for producing a purified gas stream from a feed gas stream comprising contaminants.

Gas streams comprising contaminants can originate from various sources.

For example, numerous natural gas wells produce what is called "sour gas", i.e. natural gas comprising sulphur contaminants such as $H_2S$, aliphatic and/or aromatic mercaptans (RSH, wherein R is an alkyl group or an aryl group) sulphides, disulphides and thiophenes in concentrations that makes the natural gas unsuitable for direct use. Natural gas is a general term that is applied to mixtures of light hydrocarbons and optionally other gases (nitrogen, carbon dioxide, helium) derived from natural gas wells. The main component of natural gas is methane. Further, often ethane, propane and butane are present. Carbon dioxide may be present as well. In some cases (small) amounts of higher hydrocarbons may be present, often indicated as natural gas liquids or condensates. When produced together with oil, the natural gas is usually called associated gas.

Other examples of gas streams comprising contaminants, especially sulphur contaminants, are gas streams used and obtained in refineries from feed gas streams comprising contaminants, for example feed gas streams obtained in hydrodesulphurisation processes.

Producing a purified gas stream generally involves removal of contaminants, especially sulphur contaminants, from these contaminated gas streams.

Processes for producing purified gas stream from a gas stream comprising sulphur contaminants are known in the art. For example, in EP 1,338,557 a process is described wherein contaminants are removed from a natural gas stream using an aqueous amine absorption liquid. The loaded amine absorption liquid obtained is regenerated, thereby producing a sour gas stream comprising $H_2S$, RSH and $CO_2$. This sour gas stream is separated into a residual gas stream comprising RSH and a gas stream enriched in $H_2S$ in a second absorption stage. The gas stream enriched in $H_2S$ is subjected to a Claus process to produce elemental sulphur and a Claus off-gas. This Claus off-gas is then heated and mixed with the residual gas stream. The resultant mixed gas is transferred to a hydrogenation reactor, wherein sulphur compounds, including RSH, are converted to $H_2S$. The thus-formed $H_2S$ is recovered using a sequence of absorbing and regeneration steps and returned to the Claus process.

A disadvantage of the process described in EP 1,338,557 is that variations in concentration of RSH and/or hydrocarbon compounds in the starting gas stream may lead to operational problems of the hydrogenation zone. Another, even more important, disadvantage is that depending on the type of RSH, the conversion is still low, typically even below 80%. The result of the low RSH conversion is that the gas stream exiting the hydrogenation zone will still comprise relatively high levels of RSH. This RSH will eventually end up in a gas stream which is sent to an incinerator. In the incinerator, unconverted RSH will be incinerated to $SO_2$, leading to an increased emission of $SO_2$ into the atmosphere. In view of increasingly stringent environmental demands, emission of $SO_2$ should be kept down to low levels.

It has now been found that RSH conversion can be considerably improved through the use of a dedicated RSH conversion reactor in addition to a Claus off-gas treating reactor.

Accordingly, the invention provides a process for producing a purified gas stream from a feed gas stream comprising contaminants, the process comprising the steps of:

(a) removing contaminants from the feed gas stream to obtain the purified gas stream and a sour gas stream comprising $H_2S$ and RSH;

(b) separating the sour gas stream comprising $H_2S$ and RSH into a gas stream enriched in $H_2S$ and a residual gas stream comprising RSH;

(c) converting $H_2S$ in the gas stream enriched in $H_2S$ to elemental sulphur in a Claus unit, thereby obtaining a first off-gas stream comprising $SO_2$;

(d) converting $SO_2$ in the first off-gas stream comprising $SO_2$ to $H_2S$ in a Claus off-gas treating reactor to obtain a second off-gas stream comprising $H_2S$;

(e) converting RSH from the residual gas stream comprising RSH to $H_2S$ in an RSH conversion reactor to obtain a residual gas stream comprising $H_2S$, wherein at least one of the operating conditions of the RSH conversion reactor is different from the corresponding operating condition of the Claus off-gas treating reactor.

The process according to the invention enables high conversion of RSH, even at relatively high gas hourly space velocities (GHSV's). RSH conversions of even higher than 90% can be achieved.

The operating conditions of the RSH conversion reactor can be adjusted and optimised for RSH removal, independent of the operating conditions of the Claus off-gas treating reactor, in order to achieve a high RSH conversion. In particular, the operating temperature of the RSH conversion reactor can be adjusted independently of the Claus off-gas treating reactor. Changes in composition of the feed gas stream and/or possible fluctuations in RSH concentration in the feed gas stream will translate into changes in composition and/or fluctuations in RSH concentration in the residual gas stream comprising RSH which is fed to the RSH conversion reactor. These changes and/or fluctuations can be handled by adjusting the conditions in the RSH conversion reactor. A higher degree of RSH conversion can thus be achieved. Suitably, RSH conversions of 90% or even more can be achieved, resulting in low levels of RSH in the gas stream exiting the RSH conversion reactor.

Because the off-gas stream comprising $SO_2$ originates from the Claus unit only and is depleted of RSH, the Claus off-gas treating reactor is fed with a gas stream having negligible variation in concentration. Stable operation of the Claus off-gas treating reactor can be assured, because the Claus off-gas treating reactor now mainly handles removal of sulphur contaminants other than RSH from a gas stream with hardly any variation in composition with regard to these contaminants.

Another advantage is that the use of a dedicated RSH conversion reactor provides operational flexibility in the event of operational problems in the process, for example in the event that excess coke-formation takes place, especially in the RSH reactor. The presence of hydrocarbons in the residual gas stream comprising RSH may result in the formation of coke. Because the residual gas stream comprising RSH is treated in the RSH conversion reactor and not in the Claus off-gas treating reactor, the Claus off-gas treating reactor will not be affected by coke formation, even in the event of potential shut-down of the RSH conversion reactor, and can be operated at normal operating conditions.

Any feed gas stream comprising $H_2S$ and RSH as contaminants can be processed. Suitably, the feed gas stream comprises natural or associated gas.

RSH includes aliphatic RSH, especially $C_1$-$C_6$ RSH, more especially $C_1$-$C_4$ RSH, aromatic RSH, especially phenyl mercaptan, or mixtures of aliphatic and aromatic RSH. The invention especially relates to the removal of methyl mercaptan (R=methyl), ethyl mercaptan (R=ethyl), normal- and iso-propyl mercaptan (R=propyl) and butyl mercaptan (R=butyl) isomers. Mercaptans having 3 or more carbon atoms (n-propylmercaptan, iso-propylmercaptan and butylmercaptan) are henceforth referred to as $C_3$+ RSH.

The process according to the invention is especially suitable for feed gas streams comprising $H_2S$ and optionally also significant amounts of carbon dioxide, as both compounds are efficiently removed in the liquid absorption process in step (a).

Suitably the total feed gas stream comprises in the range of from 0.05 to 20 vol % $H_2S$, from 1 ppmv to 1 vol % RSH and from 0 to 40 vol % carbon dioxide, based on the total feed gas stream. Preferably, the feed gas stream comprises from 0.1 to 10 vol % $H_2S$, from 20 ppmv to 1 vol % RSH and from 0 to 30 vol % carbon dioxide, based on the total feed gas stream.

Suitably, an absorbing liquid is used in step (a) to remove contaminants by transferring contaminants from the feed gas stream to the absorbing liquid. This results in an absorbing liquid loaded with contaminants. The loaded absorbing liquid is regenerated by contacting with a regeneration gas. This results in a sour gas stream comprising $H_2S$ and RSH.

The absorbing liquid is any liquid capable of removing contaminants, in particular $H_2S$, from the feed gas stream. The choice of absorbing liquid depends inter alia on the type of contaminants to be removed. In the case of a feed gas stream comprising natural gas, the major contaminants are $H_2S$, RSH and carbon dioxide. Other contaminants may include COS, $CS_2$ and thiophenes.

A preferred absorbing liquid comprises a chemical solvent as well as a physical solvent.

Suitable chemical solvents are primary, secondary and/or tertiary amines. A preferred chemical solvent is a secondary or tertiary amine, preferably an amine compound derived from ethanol amine, more especially DIPA, DEA, MMEA (monomethyl-ethanolamine), MDEA, or DEMEA (diethyl-monoethanolamine), preferably DIPA or MDEA. It is believed that these chemical solvents react with acidic compounds such as $H_2S$ and/or $CO_2$, thereby removing $H_2S$ and/or $CO_2$ from the feed gas stream.

Suitable physical solvents are sulfolane (cyclo-tetramethylenesulfone) and its derivatives, aliphatic acid amides, N-methylpyrrolidone, N-alkylated pyrrolidones and the corresponding piperidones, methanol, ethanol and dialkylethers of polyethylene glycols or mixtures thereof. The preferred physical solvent is sulfolane. It is believed that $H_2S$ and/or $CO_2$ will be taken up in the physical solvent and thereby removed from the feed gas stream. Additionally, RSH will be taken up in the physical solvent as well.

The absorbing liquid may also comprise a so-called activator compound. The addition of an activator compound to an absorbing liquid system is believed to result in an improved removal of acidic compounds. Suitable activator compounds are piperazine, methyl-ethanolamine, or (2-aminoethyl)ethanolamine, especially piperazine.

Preferably, the absorbing liquid comprises sulfolane, MDEA and piperazine.

A preferred absorbing liquid comprises in the range of from 15 to 45 parts by weight, preferably from 15 to 40 parts by weight of water, from 15 to 40 parts by weight of sulfolane, from 30 to 60 parts by weight of a secondary or tertiary amine derived from ethanol amine, and from 0 to 15 wt %, preferably from 0.5 to 10 wt % of an activator compound, preferably piperazine, all parts by weight based on total solution and the added amounts of water, sulfolane, amine and optionally activator together being 100 parts by weight. This preferred absorbing liquid enables removal of hydrocarbons, carbon dioxide, hydrogen sulphide and/or COS from a gas stream comprising these compounds.

The operating conditions of step (a) can be adjusted to enable producing a purified gas stream from feed gas streams which, in addition to $H_2S$ and RSH, further comprises other compounds, in particular selected from the group of carbon dioxide, BTX and other sulphur contaminants. The process offers a choice whether or not to remove compounds other than hydrogen sulphide and RSH, for example other sulphur-containing compounds or carbon dioxide or aromatic compounds, from the feed gas stream. Hence, different compositions of the gas stream obtained in step (a) can be achieved, suitably by adjusting the choice of absorbing liquid in step (a). Suitably, the liquid absorption is carried out at a temperature in the range of from 15 to 90° C., more preferably from 25 to 80° C., still more preferably from 40 to 65° C.

The liquid absorption is suitably carried out at a pressure between 10 and 150 bara, especially between 25 and 90 bara. Absorbing liquids comprising a chemical and a physical solvent perform well at high pressures, especially between 20 and 90 bara. Hence, in the case that the feed gas stream is pressurised, for example if the feed gas stream is a natural gas stream obtained at high pressure, no depressurising step is needed. Yet another advantage is that the use of a combined physical/chemical absorbing liquid, rather than an aqueous chemical absorbing liquid only, also results in the possibility of flashing any carbon dioxide at relatively high pressures (i.e. between 5 and 15 bara). This reduces re-compression requirements, e.g. for re-injection.

Step (a) is suitably carried out in a zone having from 5-80 contacting layers, such as valve trays, bubble cap trays, baffles and the like. Structured packing may also be applied. The amount of $CO_2$-removal can be optimised by regulating the solvent/feed gas ratio. A suitable solvent/feed gas ratio is from 1.0 to 10 (w/w), preferably between 2 and 6.

The purified gas stream obtained in step (a) is depleted of $H_2S$, meaning that the concentration of $H_2S$ in the purified gas stream is lower than the concentration of $H_2S$ in the feed gas stream. It will be understood that the concentration of $H_2S$ in the purified gas stream obtained in step (a) depends on the concentration of $H_2S$ in the feed gas stream. Typically, the concentration of $H_2S$ in the purified gas stream is in the range of from 0.0001% to 80%, preferably from 0.0001% to 20%, more preferably from 0.0001% to 10% of the $H_2S$ concentration in the feed gas stream. Suitably, the concentration of $H_2S$ in the purified gas stream obtained in step (a) is less than 10 ppmv, preferably less than 5 ppmv.

It will be understood that the RSH concentration in the purified gas stream will depend on the RSH concentration in the feed gas stream. Suitably, RSH concentrations in the purified gas stream will be in the range of from 100 ppbv to 0.1 vol %. Optionally, the purified gas stream may be subjected to an additional step to further remove mercaptans. A suitable way to achieve further removal of mercaptans is described in Hydrocarbon engineering June 2001, pages 55-60 and involves adsorption of mercaptans using an adsorbent bed, followed by regeneration of the adsorbent bed which now comprises mercaptans. Suitable solid adsorbent materials include materials based on silica, silica gel, alumina or silica-alumina, In the adsorbent bed, generally two zones, an equilibrium zone and a mass transfer zone, can be distinguished. In the equilibrium zone, the amount of adsorbed material is in equilibrium with the partial pressure of the component in the feed. In the mass transfer zone, the adsorbent is actively adsorbing the component from the gas stream.

Adsorption of components from a gas mixture onto solid adsorbents is a thermal exothermic process. This process is generally reverted by applying heat to the adsorbent and adsorbate phase. If the heat applied is sufficient, the adsorbed components will leave the adsorbent internal surface and pores. To complete the regeneration process, the adsorbent is once again cooled to its initial temperature. This reversion of the adsorption process is called regeneration.

Preferred solid adsorbents are zeolites having openings capable of letting a species enter or pass. In some types of zeolites, the opening is suitably defined as a pore diameter whereas in other types the opening is suitably defined as openings in a cage structure. In the case that water is present in the hydrocarbon stream, a more efficient process is obtained when the water is removed before mercaptan removal takes place, preferably by adsorbing the water on a zeolite having a pore diameter of less than 5 Å. This will result in a very low level of mercaptans, suitably in the range of 20 ppbv or even less.

The purified gas stream can be processed further in known manners. For example, the purified gas stream can be subjected to catalytic or non-catalytic combustion, to generate electricity, heat or power, or can be used as a feed gas for a chemical reaction or for residential use. In the event that the feed gas stream comprises natural gas, the purified gas stream can also be cooled to obtain liquefied natural gas (LNG), as for example described in WO 99/60316 or WO 00/29797, the contents of which patent applications are incorporated herein. Thus, the invention also provides LNG formed by cooling a purified gas stream obtained by the process according to the invention.

In the liquid absorption step, loaded absorbing liquid comprising contaminants such as $H_2S$, RSH and optionally $CO_2$ and/or other sulphur compounds such as carbonyl sulphide and BTX is obtained. The absorption step will usually be carried out in a continuous mode, which process also comprises the regeneration of the loaded absorbing liquid. Therefore, contaminant removal preferably involves a regeneration step wherein loaded absorbing liquid is regenerated by transferring at least part of the contaminants to a regeneration gas stream. Suitably, regeneration takes place at relatively low pressure and high temperature. The loaded absorbing liquid may contain besides $H_2S$ and RSH also appreciable amounts of other compounds from the feed gas stream e.g. hydrocarbons, carbon monoxide and hydrogen. Therefore, it may be advantageous to remove these (non-acidic) compounds at least partially from the loaded solvent by flashing to a pressure which is higher than the sum of the partial pressures of the compounds. In this way only very small amounts of $CO_2$ and optionally $H_2S$ and COS are released from the solvent together with the (non-acidic) compounds. The regeneration is suitably carried out by heating in a regenerator at a relatively high temperature, suitably in the range of from 70 to 150° C. The heating is preferably carried out with steam or hot oil. Preferably, the temperature increase is done in a stepwise mode. Suitably, regeneration is carried out at a pressure in the range of from 1 to 2 bara.

After regeneration, regenerated absorbing liquid is obtained and a sour gas stream comprising $H_2S$ and RSH. Optionally, the sour gas stream may further comprise carbon dioxide and carbonyl sulphide. Preferably, regenerated absorbing liquid is used again in the absorption stage of step (a) for $H_2S$ removal. Suitably the regenerated absorbing liquid is heat exchanged with loaded absorbing liquid to use the heat elsewhere.

In step (b), the sour gas stream comprising $H_2S$ and RSH is separated in an enrichment reactor to obtain a gas stream enriched in $H_2S$ and a residual gas stream comprising RSH.

A preferred method to achieve this separation is by subjecting the sour gas stream to a selective absorption step, wherein $H_2S$ is absorbed preferentially. The selective absorption of $H_2S$ is known in the art, as can be seen in A Kohl, F Riesenfeld, Gas Purification, $3^{rd}$ ed. Gulf Publishing Co, Houston, 1979. Selective absorption liquids comprise aqueous solutions of alkanol amines, such as DEA, TEA, DIPA, MDEA, polyethylene glycol dialkyl ether or N,N-dimethyl ammonium acetate. A mixture of sulfolane and alkanolamine may also be used. Other selective absorbents include N-methylpyrrolidone, and tributyl phosphate.

In step (b), a residual gas stream comprising RSH is obtained. The residual gas stream may further comprise other compounds, for example carbon dioxide and/or aromatic compounds, especially hydrocarbons and/or BTX, which were not absorbed in the selective absorption step. This will for example occur when a chemical solvent, especially MDEA, is used as absorbing liquid in step (a). Suitably, the concentration of $H_2S$ in the residual gas stream will be substantially lower compared to the feed gas stream.

Absorbed $H_2S$ is subsequently desorbed by regeneration as described hereinabove, yielding a gas stream enriched in $H_2S$. In step (c), this gas stream enriched in $H_2S$ is then passed to a Claus unit, thereby obtaining a first off-gas stream comprising $SO_2$.

In the Claus unit hydrogen sulphide is converted to elemental sulphur via the well-known Claus process. The Claus process is a process wherein elemental sulphur is formed by partial oxidation of the $H_2S$ using oxygen-containing gas (including pure oxygen) to form $SO_2$, followed by reaction of the $SO_2$ formed with the remaining part of the $H_2S$, in the presence of a catalyst. The most widely used Claus catalyst is non-promoted spherical activated alumina. The Claus unit suitably comprises a combustion chamber followed by two or more catalyst beds and two or more condensers. The reaction products are cooled in these condensers and liquid elemental sulphur is recovered. Since the yield of elemental sulphur, relative to the hydrogen sulphide introduced, is not quantitative, a minor amount of unreacted hydrogen sulphide, and sulphur dioxide remains in the off-gases from the Claus unit. The off-gas from the Claus unit, which is the first off-gas stream, comprises $SO_2$.

In step (d), the first off-gas stream comprising $SO_2$ is passed to a Claus off-gas treating reactor. In the off-gas treating reactor sulphur dioxide is reduced to hydrogen sulphide in a hydrogenation reaction. Further, COS (if present) is converted to hydrogen sulphide. A preferred off-gas treating reactor is a so-called SCOT reactor, i.e., Shell Claus Off-gas Treating reactor, as for example described in the earlier mentioned textbook by Kohl and Riesenfeld. The first off-gas stream comprising $SO_2$ is first heated and then contacted with a catalyst, resulting the formation of $H_2S$. A second off-gas stream comprising $H_2S$ is emitted from the Claus off-gas treating reactor.

The temperature in the Claus off-gas treating reactor is suitably in the range of from 210 to 350° C., preferably of 150 to 250° C.

In step (e), RSH from the residual gas stream comprising RSH obtained in step (b) is converted to $H_2S$ in an RSH conversion reactor.

As set out earlier, the conditions in the RSH conversion reactor are chosen such that high RSH conversion is achieved. This is achieved because the RSH conversion reactor is operated independently from the Claus off-gas treating reactor. The RSH conversion reactor will be operated such that at least one of the operating conditions is different from the corresponding operating condition of the Claus off-gas treating reactor. Examples of operating conditions are temperature and gas hourly space velocities.

In a preferred embodiment, the operating temperature of the RSH conversion reactor is different than the operating temperature of the off-gas treating reactor.

In an especially preferred embodiment, the operating temperature of the RSH conversion reactor is higher than the operating temperature of the Claus off-gas treating reactor. Preferably, the operating temperature of the RSH conversion reactor is in the range of from 10 to 150° C. higher, preferably from 20 to 150° C. higher than to the operating temperature of the Claus off-gas treating reactor. This temperature difference ensures an optimal RSH conversion.

Since suitable temperatures in the Claus off-gas treating reactor are in the range of from 210 to 320° C., in this preferred embodiment the temperature in the RSH conversion reactor ranges from 300 to 425, more preferably from 320 to 400° C.

The RSH conversion reactor preferably comprises a catalyst, capable of converting RSH. The catalyst suitably comprises at least one metal selected from the group consisting of copper, cobalt, chromium, vanadium and molybdenum. The catalyst preferably contains the active metal compounds on a carrier. The metal is suitably present on the catalyst in the form of its oxide or sulphide. The carrier can be selected from the group consisting of alumina, silica, silica-alumina, titania, zirconia and magnesia.

The process described in EP-A 1 338 557 employs one reactor in the Claus off-gas treating unit. The reaction conditions of that reactor are said to be a temperature of 230 to 300° C. and a gas hourly space velocity of 500-3000 $hr^{-1}$. An advantage of the process of the present invention is that the conditions of the two reactors, the hydrogenation reactor and the RSH conversion reactor, can be optimised independently. That does not only apply to the temperature, but also to the gas hourly space velocity that can be selected such that the most optimal operation possible is obtained for each reactor. It will be evident that the higher the gas hourly space velocity is, the smaller the reactor can be, thus improving the economic feasibility of the process. Whereas the examples in EP-A 1 338 557 are carried out at a gas hourly space velocity of 1000 $hr^{-1}$, the conditions of the separate reactors in the present invention allow for higher space velocities. Thus, smaller reactors can be used, resulting in considerable cost-saving as well as easier operation. The space velocity of the RSH conversion reactor zone is preferably in the range of from 1000 to 5000 $hr^{-1}$, preferably from 1100 to 3000 $hr^{-1}$. Excellent results have been obtained with space velocities in the range of from 1500 to 2500 $hr^{-1}$.

An especially preferred embodiment further comprises step (f) of cooling the residual gas stream comprising $H_2S$ and cooling the second off-gas stream comprising $H_2S$ and contacting both cooled gas streams with absorbing liquid, thereby transferring $H_2S$ from both gas streams to the absorbing liquid to obtain absorbing liquid loaded with $H_2S$ and an outlet gas stream. The loaded absorbing liquid is preferably regenerated by contacting it with a stripping gas. Because the concentration of RSH in the residual gas stream comprising $H_2S$ is low, the amount RSH and of $H_2S$ in the outlet gas stream will also be low.

A preferred way of disposing of the outlet gas stream is sending the outlet gas stream to an incinerator to obtain exhaust gas, which is sent to the atmosphere, in an additional step (g). Because the amount of RSH in the outlet stream is low, the amount of sulphur dioxide, generated as a result of incineration of RSH and emitted into the atmosphere, will also be low. Thus, the process enables compliance with strict environmental regulations, while at the same time enabling removal of RSH to very low levels.

The operation of the RSH conversion reactor will now be illustrated by the following non-limiting examples.

EXAMPLE 1

According to the Invention

A residual gas stream comprising RSH having a composition as defined in Table 1 was contacted at different temperatures with a catalyst comprising Co/Mo at a gas hourly space velocity (GHSV) of 2500 $hr^{-1}$. The RSH concentration in the gas stream leaving the RSH conversion reactor was measured using gas chromatography and the conversion at different temperatures was determined. The results are given in Table 2.

TABLE 1 composition in mol % of residual gas stream comprising RSH.

| Compound | Mol % | Compound | Mol % |
|---|---|---|---|
| $H_2O$ | 6.45 | C7 | 0.32 |
| $CO_2$ | 80.37 | C8 | 0.25 |
| $H_2S$ | 0.02 | C9 | 0.13 |
| COS | 0.001 | C10 | 0.07 |
| $N_2$ | 4.71 | $CH_3SH$ | 0.22 |
| $H_2$ | 2.30 | $C_2H_5SH$ | 0.70 |
| C1 (methane) | 5.58 | Benzene | 0.44 |
| C5 | 0.24 | Toluene | 0.98 |
| C6 | 0.44 | Xylene | 0.13 |

TABLE 2

RSH conversion at different temperatures.

| Temperature (° C.) | Conversion $CH_3SH$ | Conversion $C_2H_5SH$ |
|---|---|---|
| 240 | 17 | 50 |
| 280 | 40 | 85 |
| 320 | 78 | 95 |
| 350 | 90 | 97 |

The results show that high RSH conversions can be achieved. The RSH conversion can be steered by adjusting the temperature.

EXAMPLE 2

According to the Invention

A residual gas stream comprising RSH having a composition as defined in Table 1 was contacted at different GHSV's with a catalyst comprising Co/Mo at a temperature of 350° C. The RSH concentration in the gas stream leaving the RSH conversion reactor was measured using gas chromatography and the conversion at different temperatures was determined. The results are given in Table 3.

TABLE 3

| | RSH conversion at 350° C. | | | |
|---|---|---|---|---|
| GHSV (hr$^{-1}$) | CH$_3$SH | C$_2$H$_5$SH | 1-C$_4$H$_9$SH | 2-C$_4$H$_9$SH |
| 2500 | 90 | 97 | | |
| 1500 | 88 | 98 | 98 | 93 |

The results show that even at high GHSV's, an excellent RSH conversion is achieved.

That which is claimed is:

1. A process for producing a purified gas stream from a feed gas stream comprising contaminants, the process comprising the steps of:
   (a) removing contaminants from the feed gas stream to obtain the purified gas stream and a sour gas stream comprising H$_2$S and RSH wherein R is an alkyl group or an aryl group;
   (b) separating the sour gas stream comprising H$_2$S and RSH into a gas stream enriched in H$_2$S and a residual gas stream comprising RSH;
   (c) converting H$_2$S in the gas stream enriched in H$_2$S to elemental sulphur in a Claus unit, thereby obtaining a first off gas stream comprising SO$_2$;
   (d) converting SO$_2$ in the first off gas stream comprising SO$_2$ to H$_2$S in a Claus off gas treating reactor to obtain a second off gas stream comprising H$_2$S; and
   (e) converting RSH from the residual gas stream comprising RSH to H$_2$S in a RSH conversion reactor which reactor is separate from and in addition to said Claus off-gas treating reactor, to obtain a residual gas stream comprising H$_2$S, wherein at least one of the operating conditions of the RSH conversion reactor is different from the corresponding operating condition of the Claus off-gas treating reactor.

2. A process according to claim 1, further comprising the step of:
   (f) cooling the residual gas stream comprising H$_2$S and cooling the second off gas stream comprising H$_2$S and contacting both cooled gas streams with absorbing liquid, thereby transferring H$_2$S from both gas streams to the absorbing liquid to obtain absorbing liquid loaded with H$_2$S and an outlet gas stream.

3. A process according to claim 2, further comprising the step of:
   (g) sending the outlet gas stream to an incinerator to obtain exhaust gas, which is sent to the atmosphere.

4. A process according to claim 3, wherein the operating condition is temperature.

5. A process according to claim 4, wherein the off-gas comprising SO$_2$ further comprises COS and COS is converted to H$_2$S in the Claus off-gas treating reactor.

6. A process according to claim 5, wherein the operating temperature of the RSH conversion reactor is higher than the operating temperature of the Claus off-gas treating reactor.

7. A process according to claim 6, wherein the operating temperature of the RSH conversion reactor is in the range of from 10 to 150° C. higher—than the operating temperature of the Claus off-gas treating reactor.

8. A process according to claim 7, wherein the operating temperature of the Claus off-gas treating reactor is in the range of from 210 to 350° C.

9. A process according to claim 8, wherein the operating temperature of the RSH conversion reactor is in the range of 300 to 425° C.

10. A process according to claim 9, wherein the RSH concentration in the residual gas stream is in the range of from 10 ppmv to 1 vol % based on the total residual gas stream.

11. A process according to claim 10, wherein the RSH conversion reactor comprises a catalyst capable of converting RSH.

12. A process according to claim 11, wherein the RSH conversion catalyst comprises molybdenum in combination with at least one compound selected from the group consisting of compounds of cobalt, nickel and tungsten.

13. A process according to claim 12, wherein the gas hourly space velocity in the RSH conversion reactor is in the range of from 1100 h$^{-1}$ to 10000 h$^{-1}$.

14. A process according to claim 13, wherein the operating temperature of the RSH conversion reactor is in the range of 320 to 400° C., the gas hourly space velocity in the RSH conversion reactor is in the range of from 1100 h$^{-1}$ to 3,000 h$^{-1}$, and a RSH conversion of 90 or more is achieved.

15. A process according to claim 14, the gas hourly space velocity in the RSH conversion reactor is in the range of from 1,500 h$^{-1}$ to 2,500 h$^{-1}$.

* * * * *